(12) United States Patent
Sacs (10) Patent No.: US 6,849,188 B2
(45) Date of Patent: Feb. 1, 2005

(54) MAGNETIC CONDITONING OF FLUIDS AND GASES AND APPARATUS THEREFOR

(76) Inventor: Steven Sacs, 460 2nd Ave., Apt. 11A, New York, NY (US) 10016

(*) Notice: Subject to any disclaimer, the term of this patent is extended or adjusted under 35 U.S.C. 154(b) by 151 days.

(21) Appl. No.: 10/321,943

(22) Filed: Dec. 17, 2002

(65) Prior Publication Data

US 2003/0150816 A1 Aug. 14, 2003

Related U.S. Application Data

(60) Provisional application No. 60/344,019, filed on Dec. 28, 2001.

(51) Int. Cl.$^7$ .............................. C02F 1/48; F02M 27/04

(52) U.S. Cl. ..................... 210/695; 210/222; 123/536; 123/538; 96/1; 95/28

(58) Field of Search ................................. 210/222, 695; 123/536, 538; 96/1; 95/28

(56) References Cited

U.S. PATENT DOCUMENTS

| 5,059,743 A | * | 10/1991 | Sakuma | 210/222 |
| 5,254,247 A | * | 10/1993 | Kashani | 210/222 |
| 5,558,765 A | * | 9/1996 | Twardzik | 210/222 |
| 6,231,759 B1 | * | 5/2001 | Sato | 210/222 |

* cited by examiner

*Primary Examiner*—David A. Reifsnyder
(74) *Attorney, Agent, or Firm*—Robert L. Stone (57) ABSTRACT

Magnetic conditioning of fluids and gases flowing through a conduit or other containment vessel to achieve essentially uniform characteristics of said fluids and gases for the purposes of improved operation efficiency and performance quality of mechanisms and systems dependent on these liquids and gases. Specifically, the invention pertains to a combined application of advanced techniques including 1) use of magnets, preferably high flux density stabilized anisotropic magnets, 2) non-uniform flux density pairing, 3) magnetic field focused on an air gap using advanced insulative shielding and parallel alignment control, 4) incremental conditioning and 5) modular design.

13 Claims, 10 Drawing Sheets

Upper Piece "A"

FIG. 4A

Lower Piece "B"

FIG. 5

Upper Piece "A"

FIG. 5A

Lower Piece "B"

MAGNETIC CONDITONING OF FLUIDS AND GASES AND APPARATUS THEREFOR

CROSS REFERENCE TO RELATED APPLICATION

This application claims the benefit of U.S. Provisional Application Ser. No. 60/344,019, filed on Dec. 28, 2001.

The application of magnetic conditioning techniques has been used to effect performance of flowing substance based mechanisms or systems. The use of such techniques on the flow of hydrocarbon compound fuels through vehicle fuel lines to create more complete combustion, as well as for flow of domestic and industrial water within pipes to reduce calcium scaling along conduit walls, are two typical examples. The understanding of these applications are well known emanating from early work of scientists such as Faraday, van der Waals and Divac.

BACKGROUND

If left unaffected by external influences, such as temperature change or the introduction of a magnetic field, electrons and their respective atoms within a molecular structure assume a commonly understood state of equilibrium based on bonding characteristics such as the behavior between neighboring valence electrons. However, if an external influence is introduced, the molecular structure reacts to assume a new configuration having the least resistance.

In the case of an applied magnetic field, electrons have been shown to realign themselves with, respect to the polarity of the magnetic field due to an induced magnetic moment. This is commonly referred to as "spinflip". Furthermore, in the case of particular liquids and gases, spinflip effects a realignment of atoms within a molecule. In long hydrocarbon chains typical of petroleum based fuels, for example, this atomic realignment causes overlapping chains to separate, or "unfold", creating more contact with oxygen, and therefore a beneficial condition in which oxidation is greatly increased. The extent of oxidation, however, is dependent on both the agitation of the fluid and the contact time the unfolded hydrocarbon chains have to react with free oxygen molecules before combustion. Impurities previously locked to and trapped within the folds of hydrocarbon chains, called "pseudo-compounds", also become more exposed. The unfolding of hydrocarbon chains can be verified by a reduction in fluid viscosity. These magnetic conditioning effects of hydrocarbon fuels combine to achieve a more complete combustion of such fuels.

The state in which all electrons of atoms within a magnetic material have undergone the action of spinflip is defined as "saturation". In accepted research of classical scientists, it has been explained that all materials are magnetic to some degree. Therefore, it is fair to assume that the term "saturation" is not exclusive to only materials classified as displaying magnetic properties. Regardless, saturation is an ideal state, rarely if ever achieved even by materials displaying the strongest magnetic properties. Due to this fact, application of an increasingly stronger magnetic field to materials only yields significant results to a point of diminishing returns. This point, of course, varies depending on the material, but it can be assumed that once it is reached, any further application of a stronger magnetic field is statistically inconsequential and therefore considered economically unjustifiable.

While it is accepted that all materials are magnetic, and will undergo spinflip and therefore approach saturation to some extent, it can be argued that many materials displaying weak magnetic properties are not likely to approach saturation to any significant degree. In the case of certain flowing fluids and gases, however, research has shown these substances to readily react to the presence of a magnetic field by subatomic spinflipping, thereby approaching saturation to an appreciable degree. As indicated above, measuring a flowing material's change in viscosity verifies this reaction.

Since the spinflip effect on a substance due to the introduction of an external magnetic field is beneficial, as was described in the case with hydrocarbon fuels, then a goal would be the saturation of said substance. As described above, however, the beneficial effect of applying continuously stronger magnetic fields to a particular substance reaches a measurable point of diminishing returns. If further application of stronger magnetic fields is effectively inconsequential, then one important factor of magnetic conditioning is to recognize that exceeding this point of diminishing returns yields no significant difference or change in effectiveness of the application.

A magnetic field is intuitively a product of a properly magnetized material, that is, a magnet. Research has shown that magnetic conditioning of substances is optimally effective when the substance flows perpendicularly through a magnetic field created between opposite poles of two separate magnets. That is, the flux lines of a mono-directional magnetic field are normal to the flow of said substance.

Magnets vary in their strength rating, measured in Gauss. Certain types of magnets, called "anisotropic" have a specific orientation direction and possess the property of a naturally denser magnetic field and are preferred. This property reduces the overall volume occupied by the magnetic field, thereby increasing the density of magnetic flux in any particular point of the field. Alternatively, there may be employed isometric magnets, such as those available as Ferrite and Alnico and some bonded (that is B10N grade) Neodymium Iron Boron, which can be magnetized to provide sufficient high flux density to be moderately effective.

Controlled flow of a substance through a magnetic field requires the presence of a conduit or containment vessel that houses a moving fluid or gas. The conduit and its contained substance, as well as any distance between the magnets and the conduit occupy a certain space between the two magnets. This space is referred to as the "air gap" Strength of the magnetic field, and subsequently its efficacy on a particular substance, is directly proportional to the length of the air gap, or the distance between each face of the opposed magnets.

A conduit can be of any material wherein its physical properties do not prevent the passage of the magnetic field into the substance. Ideally, the conduit would be of such material composition and physical dimensions that minimally inhibit the magnetic field's movement. Unfortunately, the composition and dimensions of the conduit will always tend to diminish the overall effectiveness of an externally applied magnetic field to some extent. Furthermore, due to their atomic compositions and varying molecular complexity, flows of different compounds under a constant flux density within a magnetic field will clearly approach saturation to varying degrees. Even minute variables within a particular substance, such as the non-homogeneous presence of calcium ions in tap water, will cause inconsistencies in a magnetic field's ability to saturate the substance. This varying amount of "resistance" of a particular substance to the spinflip effect of the magnetic field, as well as consideration of the measure of magnetic impermeability of a conduit material are key factors in specifying the necessary magnetic flux density for effective conditioning. An automotive fuel line is a conduit often used in the practice of this invention.

Generally, most previous literature discusses magnetic conditioning using a uniform flux density across a magnetic field. There is no positive evidence however that a magnetic field is most effective when the flux density is uniform. In other words, the benefits of non-uniform flux density magnetic fields, are not shown to be any less beneficial than uniform flux density magnetic fields. Furthermore, with respect to the resulting beneficial attributes, such as oxidation, of substances flowing through a magnetic field, it is plausible to suggest that the non-uniform flux density experienced by molecules would induce a reaction of said molecules to move towards the weaker side of the field, thereby disrupting laminar flow of the substance. This disruption, or turbulence, would constitute a condition by which a greater propensity for beneficial reactions, such as oxidation, could occur. It is therefore proposed that the application of a magnetic field with non-uniform flux density within the air gap, could in fact, result in greater overall benefits in the application of magnetic conditioning.

The magnetic properties of isotropic magnets are the same in all directions. Generally, stabilized anisotropic magnets can be magnetized to higher strength levels than isotropic magnets and can be expected to function more efficiently under stress in use, such as by proximity to a hot vehicle engine. Exposure of a magnet to demagnetizing influences expected to be encountered during use causes variations of magnet performance and/or irreversible changes in flux, typical examples of such "in-use" demagnetizing influences are: temperature variation (i.e.: standard engine operating temperatures and/or weather) or exposure to other external magnetic fields (i.e. magnetic fields introduced by an ignition coil or generator). Neodymium Iron Boron magnets generally provide a temperature coefficient range of –0.09 to –0.12%/° C., and susceptibility to a relatively low reversible temperature coefficient. These tendencies are substantiated in the said magnetic materials standard specifications respectively as "Curie temperature" as well as "working temperature" and/or "service temperature" ratings.

Specifically, for use in applications where direct and/or ambient temperature will exceed 70° C., a heat stabilized magnetic material is preferred, such as N28UH, N30H, N32SH, N35SH, N35UH, N38H, N42H. These would be particularly intended for use with hydrocarbon fuels, hot/cold water as well as other temperature sensitive applications. Stabilization is used in order to reduce Gauss variation (also known as reversible temperature coefficient) and/or to prevent irreversible loss during actual use or operation of the invention.

In addition to the strength and non-uniformity of the magnetic field in this application, concentration of the field is also of concern. If the two opposing magnets are not properly aligned, the conceptual lines of flux between the magnets will not assume optimal positioning and density. Furthermore, in the absence of insulative shielding, flux density at the point of focus in the air gap will be weaker due to its distribution over a greater space. In both cases, weaker flux density reduces the effectiveness of magnetic conditioning. Consequently, advanced insulative shielding and optimal parallel alignment are also important factors in such applications.

Finally, since the effectual result of magnetic conditioning is dependent on a fluid or gas of heterogeneous composition, and since the degree of heterogeneity of such substances in real-world environments is not constant, it can be inferred that a variety of substances, as well as a particular substance exposed to a variety of environmental conditions, will require conditioning to varying levels of degree. Moreover, the benefits of spinflipping are not limited to petroleum-based fuels. Another common example is the effect of applied magnetic fields to prevent calcium scaling on pipes where calcium ions are electromagnetically prevented from accumulating on inner walls. Nonetheless, the economic feasibility of individually prescribing a level of treatment necessary for any number of possible conditions is not reasonable. Moreover, prescribing the maximum level of treatment, or an average level of treatment, does not adequately satisfy individual concerns of efficacy and economics. Therefore, it is an important effectual and economic compromise to consider an application whereby a fixed degree of strength variations is available to sufficiently address most applications.

PRIOR ART

U.S. Pat. No. 5,558,765 [Twardzik] describes a magnetic conditioning device for treatment limited and specific only to hydrocarbon based fuels; even more specifically to liquid hydrocarbon based fuels. The importance of establishing a mono-directional magnetic field by use of magnets having opposite faces polarized north and south is emphasized. Nonetheless, Twardzik is very specific in stating that an object of his invention is to create a "uniform magnetic field." There is clearly no reference to the utilization of non-uniform flux density pairing within the air gap. Moreover, there is no discussion of insulative shielding or parallel alignment spacers between the magnets and along the walls of the conduit to optimally align the fields.

The use of ceramic magnetic material such as ceramic-8 and standard neodymium-iron-boron are suggested. Tables 1 and 2 of the patent provide general characteristics for the above magnetic materials; however, there is no specific reference to the use of high flux density anisotropic magnets, heat stability or other magnetic materials and their respective characteristics. Moreover, the concept of a magnetic flux density's point of diminishing return depends on a particular substance. Rather the utilization of magnets stronger than previous patented designs is proposed.

The Twardzik patent generally suggests that the apparatus should be positioned about the fuel delivery conduit, which is between a fuel reservoir and an oxygen/fuel mixing apparatus. It is specifically stated as an object of the invention "to position the apparatus for intensified magnetic treatment of the liquid fuel in close proximity to a fuel injecting apparatus or carburetion system." There is no mention of the concept of incremental conditioning or the benefit of agitation of the fluid flow to promote oxidation or other molecular reactions. Additionally, there is no mention or apparent consideration of the magnetic temperature coefficient, stabilization or advanced insulative shielding techniques or even a standard keeper along the outside face of the magnet specifically to affect the electromagnetic flux density of the magnet.

Indicated in the Twardzik patent is the use of a non-magnetic material plate (34) placed specifically between the permanent magnet means and the conduit. Said plate is noted intentionally to "hold the magnet in position and to have minimal affect on the electromagnetic flux density of the magnet". There is no mention of the use of this plate as a keeper along the outer surface (the magnet face opposite to the conduit) of the magnet and/or the application of any advanced insulative shielding technology.

The present invention particularly differs from the Twardzik patent in that it utilizes; A) high flux density magnets, preferably heat stabilized anisotropic magnets, incorporating the concept of a point of diminishing returns, B) non-uniform flux density pairing within the air gap to intentionally disrupt laminar flow, C) advanced insulative shielding and parallel alignment spacers to focus the magnetic field on the air gap, D) desirably incremental conditioning for better performance results, E) conditioning of both fluids and gases and F) modular design to economically address the performance needs of a wide array of applications. It is very important to note that Twardzik makes no reference, mention, use or even consideration of incremental conditioning or modular design. Also, with the higher and more consistent effect demonstrated by the present invention, the positioning of the invention is possible in a broader range of locations (i.e.: for use with hydrocarbon-based fuels; although a convenient position may be between the fuel filter and the source of combustion, typically positioned anywhere along the fuel line within and up to about an eight (8) foot (2.4 meters) distance from the point of combustion). Furthermore, the present invention is not limited to hydrocarbon-based fuels; rather, it may be used on any fluids and gasses passing through a conduit or other containment vessel and utilizing the existing inertia of the substance to be treated just prior (with more regard to time than distance) to use of the substance.

U.S. Pat. No. 5,059,742 [Sakuma] again describes a treatment limited and specific only to hydrocarbon-based fuels. No drawings are provided, but the description clearly indicates the use of an individual magnet or magnets where the intended magnetic flux density at the south pole is greater than that at the north pole of the same, individual magnet(s).

This approach specifically describes the use of individual magnets having a very weak and non-uniform magnetic flux density (5–18 Gauss). The non-uniform flux density refers specifically to a different gauss level at the north and south poles of the same magnet. In addition, the patent specifically targets its application as a pre-treatment for stored fuel. It goes on to describe the exposure and/or contact to/with the magnetic field may be achieved by agitation, or circulation of fuel within a tank. Such exposure suggests that the fuel moves around the magnet(s) and not necessarily through an air gap between two magnets.

The present invention particularly differs from the Sakuma patent in that it utilizes; A) high flux density magnets, preferably heat stabilized anisotropic magnets, incorporating the concept of a point of diminishing returns, B) non-uniform flux density pairing of two separate magnets within the air gap to intentionally disrupt laminar flow, C) advanced insulative shielding and parallel alignment spacers to focus the magnetic field on the air gap, D) desirably, incremental conditioning for better performance results E) conditioning of both fluids and gases and F) modular design to economically address the performance needs of a wide array of applications. Sakuma also makes no reference, mention, use or even the consideration of incremental conditioning or modular design. Additionally, there is no mention or apparent consideration of the magnetic temperature coefficient, stabilization or advanced insulative shielding techniques. However, his implied use of such a design in a fuel tank raises concerns about duration between the magnetic conditioning process and the purported use of the fuel. While the present invention may be positioned in a broad range of locations, it remains specified for positioning where subsequent rapid use of the substance is virtually imminent. Furthermore, the present invention is not limited to hydrocarbon-based fuels; rather, it may be used on any fluids and gasses passing through a conduit and utilizing the existing inertia of the substance to be treated just prior (with more regard to time than distance) to use of the substance.

U.S. Pat. No. 4,711,271 [Weisenbarger] makes a limited attempt to increase the efficiency of a magnetic device by use of "a metallic flux path for increasing the flux density." This patent specifies the use of two generally identical magnetic units installed externally about a conduit. The magnets are polarized to effect a directional (N-S) magnetic field, housed within a non-metallic structure and held in place by the same clamp members that provide the exterior metallic flux flow path. Here the patentee suggests that the use of an exterior clamp member made of a metallic material will "provide a continuous and uninterrupted metallic flux flow path." The patent represents that the re-directing of the external flux flow path is meant to increase the flux density and therefore provide magnetic devices with the ability to attain greater efficiency in the treatment of substances; however, such a magnetic flow path reduces the smooth transition of a flowing substance into the realm of the magnetic field, thereby sacrificing the initial, beneficial effects of incremental conditioning.

The present invention generally differs in that it is comprised of a combination of other important and unique innovations. It particularly differs from the Weisenbarger patent in that it utilizes; A) high flux density magnets, preferably heat stabilized anisotropic magnets, incorporating the concept of a point of diminishing returns, B) non-uniform flux density pairing within the air gap to intentionally disrupt laminar flow, C) advanced insulative shielding and parallel alignment spacers to focus the magnetic field on the air gap without reducing the initial, beneficial perimeter effects of preliminary incremental conditioning, D) desirably, incremental conditioning for better performance results in the conditioning of both fluids and gases and F) modular design to economically address the performance needs of a wide array of applications. The Weisenbarger patent makes no reference, mention, use or even the consideration of incremental conditioning or modular design. Additionally, there is no mention or apparent consideration of the magnetic temperature coefficient, stabilization or advanced insulative shielding techniques.

SUMMARY OF THE INVENTION

An advantage of the current invention is the application and use of a modular configuration or system. With the many variables expected in real-world application of the device, the modular design allows for a customized balance for this magnetic technology with regard to the desired level of effectiveness upon a wide range of substances, the variable physical characteristics of conduits, the intended contact time, available space, temperature range, environmental characterization and cost.

A clear advantage of the current invention is the use of the parallel alignment spacers. As described, substantially parallel positioning and alignment of the magnets provide for a greater directional flux density within the air gap. It is the parallel alignment spacers that assure the initial and continued integrity of this important positioning. Without such spacers, the magnets could be installed to a position that is not parallel and/or due to outside factors (such as vibration, etc.) the positioning may change. In either case the effectiveness could be lessened in direct proportion to the degree of non-alignment.

It is an advantage of this invention to attain the highest degree of flux density within the air gap, which is directed perpendicular (normal) to the directional flow of the treated substance. As such, the use of heat stabilized magnetic materials is preferred in applications exceeding 70° C.

Another advantage of this invention is the creation of a non-uniform flux density that will effect flow turbulence of the treated substance at the molecular, atomic and subatomic levels. The difference in the flux densities between the magnets in each module creates the non-uniform flux density field of the invention within the air gap wherein the substance is treated. In either case the effectiveness could be lessened in direct proportion to the degree of non-alignment.

A specific advantage of the invention is the application of the magnetic technology in incrementally higher, non-uniform levels to effect a sequentially staged and consistently greater degree of spinflip.

An important advantage of the invention is the application of advanced insulative shielding to both enhance and encapsulate the specific magnetic field of the invention. Said shielding functions; firstly, to concentrate the effectual area of the magnetic field on the substance's flow path by reducing the propensity of conceptual flux lines to occupy space above and/or aside each magnet. Secondly, it protects the magnetic field of the invention from outside influences and also protects said outside influences from the magnetic field provided by the invention.

Other advantages of this invention will be apparent from consideration of the following specification.

In accordance with certain of its aspects this invention relates to an apparatus for magnetic conditioning of fluid and gas substances flowing through a conduit, said apparatus comprising one to eight two-part paired modules firmly mounted on the exterior surface of said conduit for fluids and gases, each part of each module being substantially parallel to the other part of the module, there being present a magnet in each part of each module in direct contact to said conduit, wherein one of the magnets in each part of each module has a higher flux density than the magnet in the paired parallel part and the polarities and alignment of each of the magnets is such that there is created a mono-directional magnetic field normal to the direction of flow of said substances in said conduit and wherein the side of one of said magnets of said module facing said conduit is opposite in polarity to the polarity of the magnet opposite to it.

Preferably the magnets are of high flux density and are heat stabilized anisotropic. The specific levels of magnetic strength of these high flux magnets are not critical. For instance, the magnet in one part of the module may have a flux density strength of about 2,200 Gauss or less to about 10,200 Gauss or more and the magnet opposite to it may have a strength of about 3,850 Gauss or less to about 11,000 Gauss or more, so long as the strengths are different, for example by at least about 800 Gauss.

Preferably either one or two up to eight module parallel pairs is mounted along the conduit surface in a straight line and positioned incrementally along said conduit, based on increasing flux density range strength, to promote a uniform unfolding of molecular chains. Alternatively, however, they could be mounted in random or in regular alternating positions at any degree around the conduit. When the conduit is a vehicle fuel line, the first module pair is within and up to about 8 feet (2.4 meters) distant from the vehicle's combustion source.

Preferably, the modular design permits a more specific application of the invention to particular types of substances and conduits or containment vessels as it allows for the ability to more efficiently apply the invention to the widest variety of substances, conduits and their individual applications.

In accordance with additional of its aspects this invention relates to a process for magnetic conditioning of fluid and gas substances comprising passing fluid or gas substances through a conduit, by firmly mounting one to eight, two-part paired modules on the exterior surface of said conduit, wherein each part of each module is substantially parallel to the other part of the module, there being present a magnet in each part of each module, wherein one of the magnets in each part of each module is of higher flux density than the magnet in the parallel part, aligning the magnets with opposite polarities on the side of each magnet facing said conduit, so that there is created a mono-directional magnetic field normal to the direction of the flow of said substances in said conduit and thereby creating a non-uniform flux density in an air gap between said modules that disrupts laminar flow of said fluids or gases and thereby increase their performance efficiency.

Preferably, advanced insulative shielding is used behind the five (5) outer faces of each magnet to concentrate the effectual area of the magnetic field on the substance's flow path by reducing the propensity of conceptual flux lines to occupy space above and/or aside of each magnet. By way of example, generally a metallic keeper is fitted to only one (one out of the six available faces) face of a magnet. Typical advanced insulative shielding refers to the use of either a one-piece, formed (2–5 sided) or fitted "keeper" or any combination of individual "keepers" used to cover no less than two and/or no more than five out of the six available faces of a square or rectangular shaped magnet. As such, advanced insulative shielding may cover 2–3-4 and/or up to 5 of the outer faces of a given magnet. Said advanced insulative shielding technology, additionally serves to effectively eliminate or reduce exposure to external magnetic fields by encapsulating the specific field of the present invention. A reciprocal advantage is attained also in that the encapsulated magnetic field of this invention is least likely to interfere with other external fields/equipment. Other external fields/equipment might be ignition coils, generators, navigation devices, computers, radios, and the like.

It is also preferable that firm parallel alignment of the modular pairs is accomplished using spacer means between the pieces of the module pairs to align both magnets, so that central flux density lines from each magnet are optimally aligned.

The apparatus is comprised of a minimum of one modular pair of magnets. Each pair of magnets is positioned in a substantially parallel manner and configured about a conduit or containment vessel in which a fluid or gas is flowing. Each magnet of a modular pair is square or rectangular in both length and cross section. Modules are positioned lengthwise along the conduit in an incremental manner to allow the magnetic field sufficient contact time with the substance in flow. The magnets of a module are aligned with respect to polarity to create a mono-directional magnetic field normal to the direction of flow of the substance through the conduit, wherein the conduit facing side of one magnet is opposite in pole to the conduit facing side of the other magnet within a module and one magnet of a modular pair is of higher flux density than the other. Moreover, the influential flux field lines of the electromagnetic circuit are perpendicular (normal) to the flow of the substance through the conduit.

Each module utilizes a magnet, preferably a heat stabilized anisotropic magnet to provide optimum flux density for conditioning of a particular substance. The difference in flux densities between the two magnets in a module creates a "non-uniform" magnetic field that induces flow turbulence within the substance. For reference within this application, the technique of applying a non-uniform flux density field within the air gap to fluids or gases flowing through a conduit or other containment vessel is termed "magnetic phasing" or "phasing".

Advanced insulative shielding is preferably used behind the five (5) outer faces of each magnet to concentrate the effectual area of the magnetic field on the substance's flow path by reducing the propensity of conceptual flux lines to occupy space above and/or aside of each magnet. Instead, these flux lines are redirected through the insulative shielding, or "keepers" towards the area of focus within the air gap. Parallel alignment control can be accomplished in a unique manner using "spacers", that is spacer means, to firmly align both magnets so that central flux density lines from both magnets are optimally aligned. These spacers are positioned on either side of the conduit, between the two magnets of a module, and prevent a decrease in the strength of the magnets directed towards the substance. By way of example typical spacers are essentially rectangular plastic pieces, matching the modules length and providing even and parallel filler for any space existing between any given modular pair. Although the spacing is determined by the diameter of the conduit and the size of each module piece, the preferred spacer means is in thickness from about 1/16" (0.16 cm) to a dimension that does not exceed the width of the magnets within each piece of each module.

The preferred insulative material (keeper) is of a flat soft iron, as soft iron is a material generally used for insulation in industrial practice. Nevertheless, it is possible that other insulative materials, such as steel, may be used. A keeper typically matches the length and width of a specific magnet face and is generally about 1/16"-7/8" (0.16 cm–2.24 cm) thick.

Modules are positioned either individually or incrementally along the conduit, based on increasing flux density range strength, to promote a uniform unfolding of molecular chains. Based upon using suitable commercially available magnets the overall range for flux density strength can be typically from about 2,200 Gauss or less to about 13,800 Gauss or more for one magnet and about 3,850 Gauss or less to about 11,000 Gauss or more for the other, with a difference of typically at least about 800 Gauss. As different magnetic materials become available these strength levels may be lowered and raised. Incremental conditioning is performed by first treating the substance with a level of directional magnetic energy to attain an initial degree of magnetic moments. For instance, a typical range for the flux density within an individual, first stage module could be 2,200 Gauss for one magnet and 3,850 Gauss for the other, with one magnet being a ceramic material and the other being the same or similar material.

A combined use of ceramic and/or Neodymium Iron Boron magnets which are heat stabilized is representative of the preferred anisotropic magnetic materials. Other anisotropic magnetic materials (i.e. Samarium Cobalt grades, etc) may be used. In addition, as other anisotropic magnetic materials become available it is expected that they too could be used. Alternatively, isometric magnets may also be considered for use, provided there is sufficient flux density.

The first stage serves to begin effecting magnetic moments on those "less resistant" molecules. As a matter of progression, once affected and "aligned," these energized molecules tend to reposition themselves while providing greater access to other, non-effected molecules. Then a second and higher level of directional magnetic energy may be applied to work more specifically and effectively on the more resistant, and now more accessible molecules, to attain a significantly higher degree of overall magnetic saturation within the substance. By way of example, a typical range for the flux density within an individual, second stage module for an apparatus having two modules could be 3,400 gauss for a magnet composed of a ceramic material and 10,200 gauss for a second magnet composed of Neodymium Iron Boron material.

As needed, additional and consistently higher levels of magnetic energy can be applied incrementally until an optimal degree of saturation is attained within the treated substance.

Modular design permits a more specific application of the invention to particular types of substances and conduits or containment vessels. It allows for the ability to more efficiently apply this invention to the widest variety of substances, conduits and their individual applications. It is not limited to incremental strength increases and non-uniform flux densities within modules, however. The higher flux density magnets may be all aligned adjacent to each other in the same upper or lower part of the modules while the lower flux density magnets are all in the opposite part of the modules. Other configurations include a staggered position of the stronger magnet in each module to promote greater agitation or flow turbulence are also desirable.

BRIEF DESCRIPTION OF THE DRAWINGS

The following illustrations are submitted to visually represent the current preferred embodiment. However, the invention is not limited to this exact configuration. The conduit and the plastic ties, where shown, are for clarity in potential use with, but are not represented as a part of this invention in and of themselves.

DETAILED DESCRIPTION OF A PREFERRED EMBODIMENT

Numbers applied to aspects of one Figure that repeat in other Figures are unchanged with respect to the features described.

Figure 1:
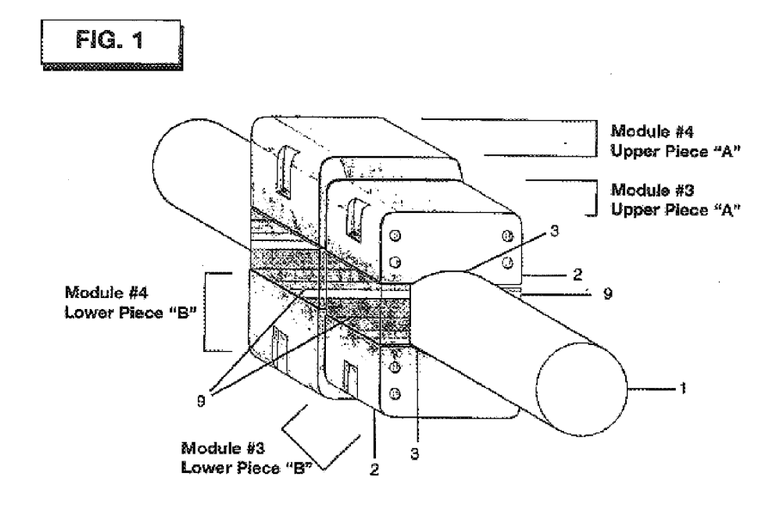
FIG. 1 is a perspective view of a two-module configuration, indicating the upper and lower pieces of each individual module. The invention is shown mounted to a conduit and the relative use of the parallel alignment spacers.
Figure 1A:
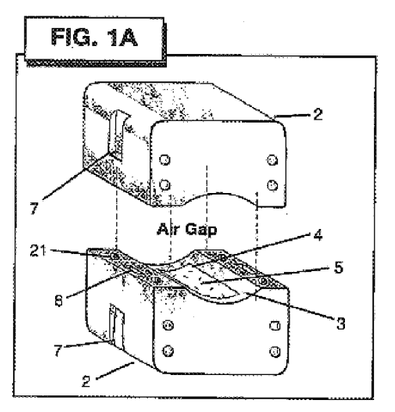
FIG. 1A is a perspective view of a section of FIG. 1 showing a typical module magnified for greater component detail. It also highlights the air gap.

The invention consists of a minimum of one, 2-piece module (with an upper piece (A) and a lower piece (B), as shown in FIG. 1). Although the total system could be comprised of up to eight modules, as few as one module may be applied effectively. Modules are configured about a conduit 1 or other containment vessel in which a fluid or gas is flowing. Each piece (upper A and lower B) of a modular pair consists of an exterior housing 2 constructed of a non-magnetic material such as, but not limited to plastic. This housing is typically of rectangular proportions, with rounded edges along the top and side faces. Magnets 5 and 5a that are contained within the housing are also of similar shape (magnet 5 is shown in FIG. 1A). The magnets of a module are aligned with respect to polarity to create a mono-directional magnetic field normal to the direction of flow of the substance through the conduit. Specifically, the conduit facing side of one magnet is opposite in pole to the conduit facing side of the other magnet within a module. Further, the conceptual flux field lines of the electromagnetic circuit are perpendicular (normal) to the flow of the substance through the conduit.

Figure 1B:
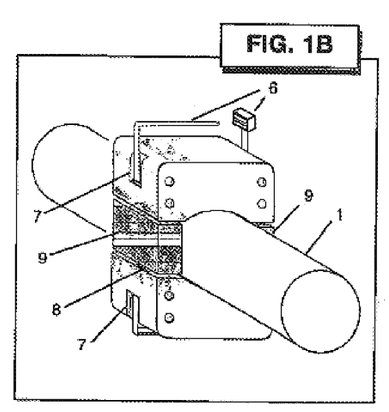
FIG. 1B shows a perspective view of the same section of a module of FIG. 1 using the parallel alignment spacers. Here the module is shown mounted to a conduit and highlights the use of a standard plastic tie to secure the module about the conduit.

The conduit 1 fits within a concave, semi-elliptical alignment channel 3 recessed into the bottom portion of each piece. This channel is specifically designed, wide and shallow, to accommodate various sized and shaped conduits. It further allows more direct positioning of the magnets towards the air gap, as shown in FIG. 1A. A rectangular opening 4 within each alignment channel 3 provides direct exposure of the contained magnets' 5 actual surface to the air gap between the modular pairs. Pieces are ideally positioned in parallel, and may be secured by use of a standard plastic tie 6, particularly shown in FIG. 1B, or the like. As illustrated the parallel positioning is top and bottom. Alternatively, the parallel pieces may be on opposite sides of the conduit or parallel to each other at diagonal angles. Indented grooves 7 on the sides of each piece lead to slotted openings 8 that are provided to accommodate a secure fit of the plastic tie. For conduits of smaller diameters, the flat face of the exterior housing generally allows for a firmly mounted flush, parallel fit. However, parallel alignment spacer means 9 of various thicknesses are provided to occupy space between both sides of the two modular pieces in the event that the size or shape of a conduit does not allow for such a firmly mounted flush, parallel fit. FIG. 1B demonstrates the ability of the parallel alignment spacers to ensure optimum positioning of the modular pair whereby the pieces are positioned parallel on all three Cartesian planes. Spacers 9 snap into shallow indents 21 found upon the bottom surface of each piece.

Figure 2:
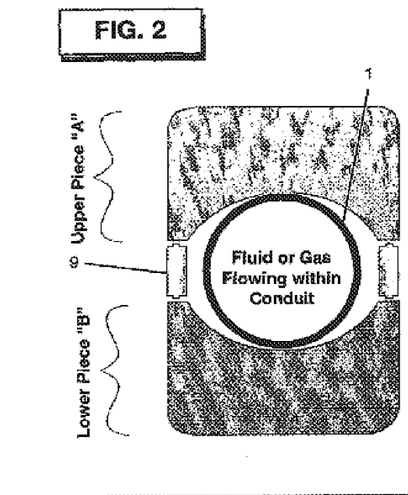
FIGS. 2 and 2A are a front elevation view of a typical module exterior and a cut-away front elevation view showing the same module, respectively.
Figure 2A:
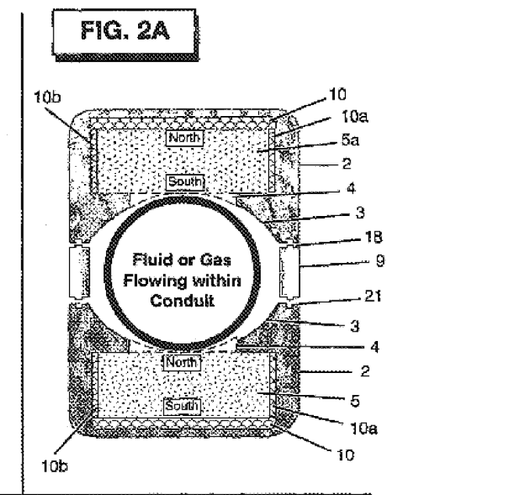

FIGS. 2 and 2A present a front elevation view and a cut-away view showing the housing 2 and highlights the use of the parallel alignment spacers 9 to maintain a consistently parallel position around the conduit 1. Each pair of modules preferably utilizes heat stabilized anisotropic magnets to provide optimum conditioning and flux density for a particular fluid or gas substance. Even with stabilized anisotropic magnets, however, the extent of conditioning would be limited by the ability of the field to effectively reach resistant groups of molecules within a substance. Here, however, one magnet 5 and 5a of a modular pair is always of higher flux density than the other magnet. The difference in flux densities of the two magnets in a module specifically creates a unique "non-uniform" magnetic flux field within the air gap that induces flow turbulence within the substance. For reference herein, the technique of specifically applying a non-uniform flux density field within the air gap to effect fluids or gases flowing through a conduit or other containment vessel is termed "magnetic phasing" or "phasing". It is this magnetic phasing technique that induces flow turbulence within the substance by increasing the level of directed magnetic energy along the central flux line within the air gap. As the flow turbulence increases so does the efficacy of the flux field upon the substance.

Within the cut-away view of FIG. 2A, the positioning of the magnets, 5 and 5a, is shown in close proximity and parallel to the conduit 1. The parallel alignment spacers 9, shown on both sides, assure the parallel positioning of both the upper and lower pieces of the module. Each spacer has connectors that snap into insets 21 (also shown in FIG. 1A) provided on housing 2. The parallel alignment channel 3 and the direct exposure opening 4 are also shown. Additionally, advanced insulative shielding 10, 10a, 10b are indicated respectively.

Figure 2B:
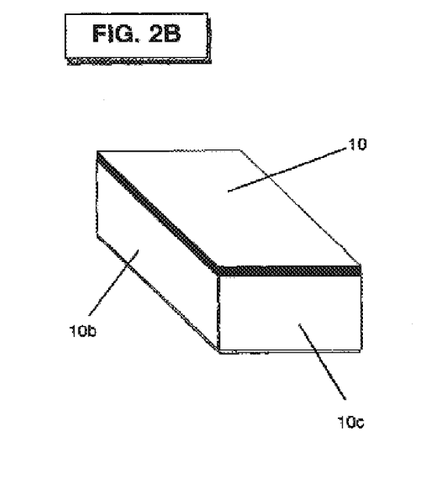
FIG. 2B is a perspective view highlighting a typical advanced insulative shielding in place around the outer surfaces of a magnet.

FIG. 2B is a perspective view highlighting a typical advanced insulative shielding in place around the outer surfaces of a magnet. Insulative shielding 10, 10b, 10c are shown used behind the respective outer face of each magnet to concentrate the effectual area of the magnetic field on the substance's flow path by reducing the propensity of conceptual flux lines to occupy space above and/or aside the magnet. Instead, these flux lines are redirected through the insulative shielding, or "keepers", towards the area of focus within the air gap. Essentially, each magnet is enclosed within a minimum of a two sided, but preferably, a five sided insulative shielding means. Only the one magnet face, which is to be exposed to a fluid or gas, remains unshielded and open for direct exposure to the substance to be conditioned.

Figure 2C:
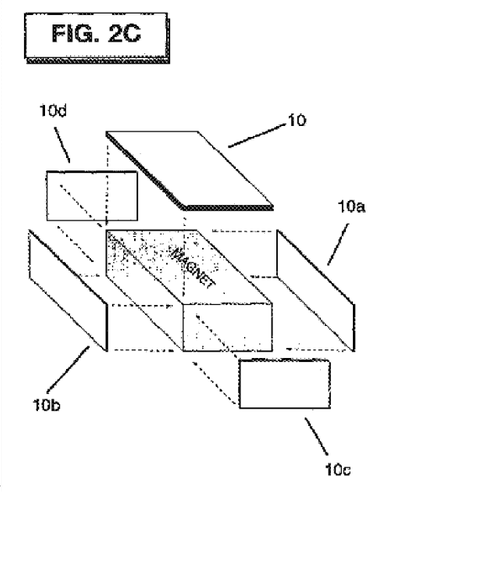
FIG. 2C is an exploded perspective view highlighting in greater detail the advanced insulative shielding around the five outer faces of a magnet.

FIG. 2C is an exploded perspective view highlighting in greater detail advanced insulative shielding 10, 10a, 10b, 10c, 10d around the five outer faces of a magnet. The magnet (either 5 or 5a) is indicated with gray shading for clarity.

Figure 2D:
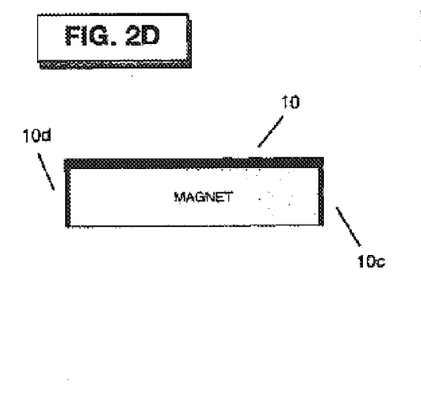
FIG. 2D is a side elevation view highlighting a typical advanced insulative shielding in place around the outer surfaces of a magnet.

FIG. 2D is a side cut-away elevation view highlighting a typical advanced insulative shielding 10, 10c, 10d in place around the respective outer surfaces of a magnet. The magnet (either 5 or 5a) is indicated with gray shading for clarity.

Figure 2E:
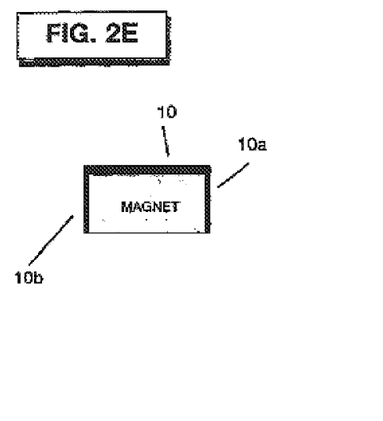
FIG. 2E is a front elevation view highlighting a typical advanced insulative shielding in place around the outer surfaces of a magnet.

FIG. 2E is a front cut-away elevation view highlighting a typical advanced insulative shielding 10, 10a, 10b in place around the outer surfaces of a magnet. The magnet (either 5 or 5a) is indicated with gray shading for clarity.

Figure 3:
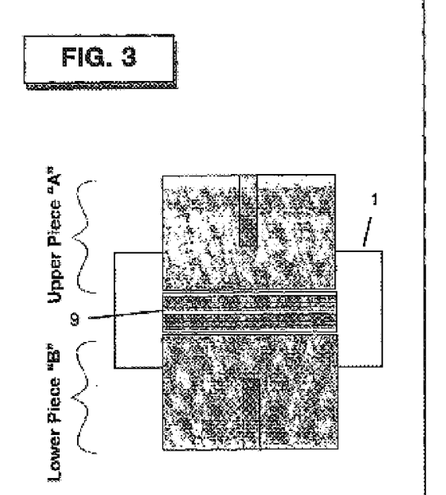
FIGS. 3 and 3A are side elevation views of a typical module exterior and a cut-away side elevation view showing the same module, respectively.

FIG. 3 provides a side elevation view of a typical module. Visually, the sides of a typical module are the same. Each shows the rounded top edge and the recessed groove provided for use with a plastic tie.

Figure 3A:
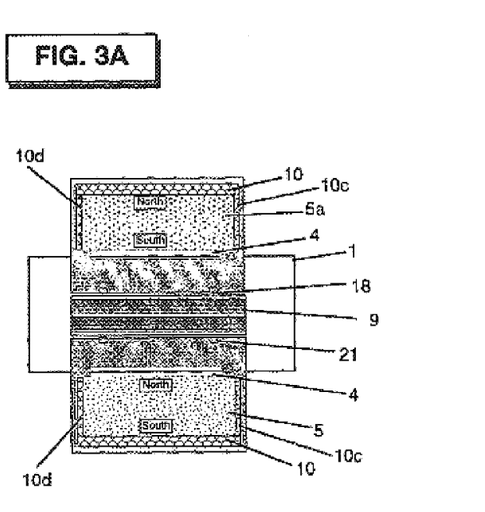

FIG. 3A is a cut-away side elevation view that illustrates the interior components in relation to the exterior housing, as well as the conduit. The use of insulative shielding 10, 10c, 10d, which are of the same length and width, dimensions as the respective magnet faces are shown.

Each magnet, 5 and 5a, of the modular pair, as can be seen from this side elevation, is shown as rectangular in both length and cross section and contained within the exterior housing of a non-magnetic material. As mentioned, the magnets of a module are aligned with respect to polarity to create a mono-directional magnetic field normal to the direction of flow of the substance through the conduit. Direct exposure of the magnet surface to the air gap is provided specifically by means of the direct exposure opening 4 that is an integral part of the above described alignment channel 3. Once again, the conceptual flux field lines of the electromagnetic circuit are perpendicular to the flow of the substance through the conduit. Connectors 18 (also shown in FIG. 2A) are present as part of the parallel alignment spacer means 9 as well as the matching connector insets 21 found in the bottom face of the housing.

Figure 4:
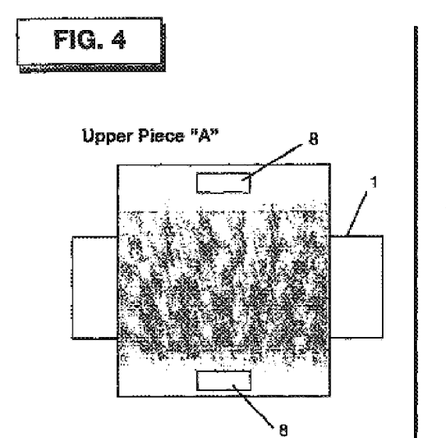
FIGS. 4 and 4A are each a plan view showing the top face of a typical module. Although visually identical the top of both the upper (A) and lower (B) pieces are shown.

In FIG. 4, the top surface of the upper piece "A" of a typical module is essentially rectangular. The rounded edges along the sides and the top, as well as the recessed slots 8 provided for sliding a plastic tie through in two places on each module piece are shown.

Figure 4A:
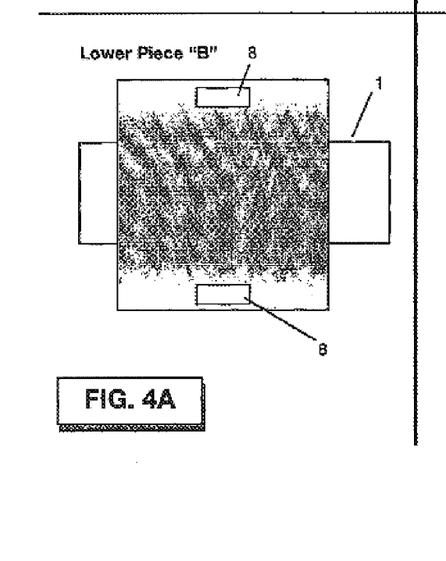

In FIG. 4A the top surface of the lower piece "B" of a typical module is shown. It is essentially rectangular and visually similar to the top surface upper piece "A".

Figure 5:
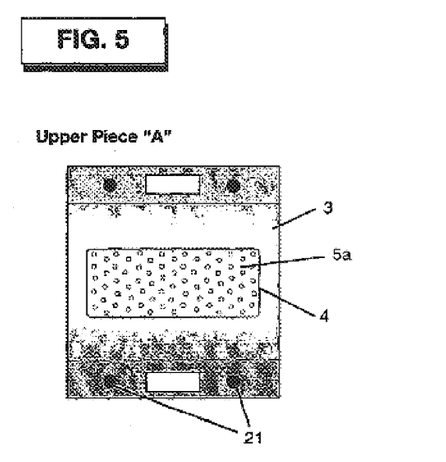
FIGS. 5 and 5A are each plan views showing the bottom face of the upper (A) and the Lower (B) pieces of a typical module. Differences of magnet composition between upper (A) and lower (B) pieces are shown.
Figure 5A:
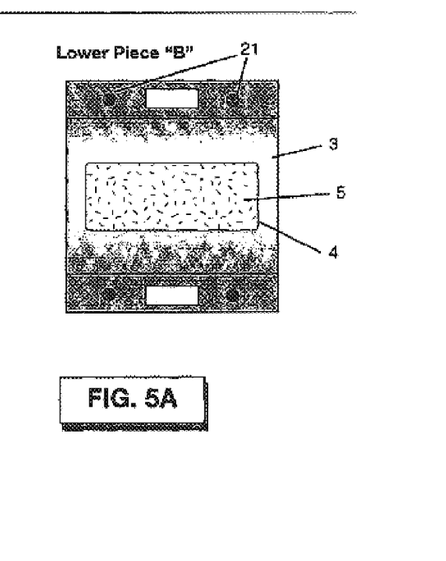

In FIG. 5, the bottom face of the upper piece "A" is shown as being essentially rectangular in shape. The concave, elliptical alignment channel 3, the direct exposure opening 4, magnet 5a and insets 21 are shown. The bottom face of the lower piece "B" is shown in FIG. 5A, as being visually similar to the corresponding face of the upper piece "A". As indicated, magnets 5 and 5a in the upper and lower pieces must be of different strengths.

Modules are positioned incrementally along a conduit, based on increasing flux density strength, to promote a uniform unfolding of molecular chains.

Figures 6, 6A:
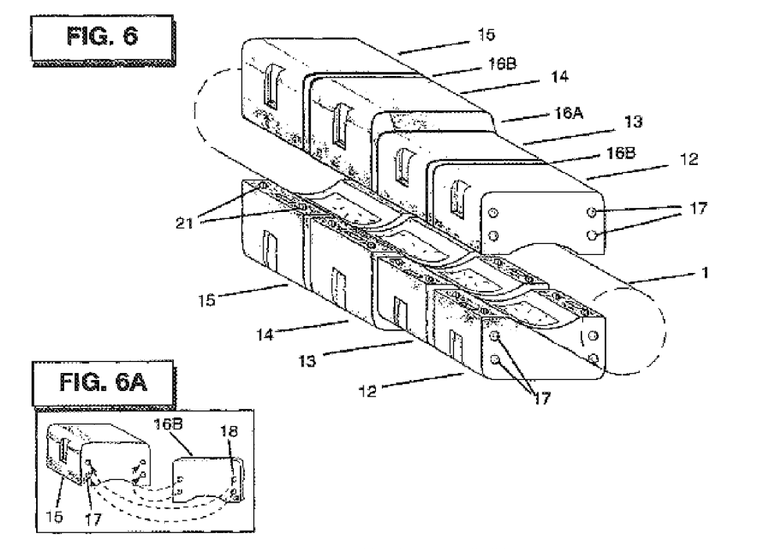
FIG. 6 is a perspective view showing a partial four module configuration.
FIG. 6A is a perspective view detailing the attachment of a module coupler and piece.

FIG. 6 demonstrates a four-module configuration. Incremental conditioning consists of first treating the substance with a level of directional magnetic energy to attain an initial degree of magnetic moments. Logically, this first level of treatment is accomplished in the first module 12, whose directional magnetic energy induces spinflipping of electrons within less resistant molecules. As a matter of progression, affected and aligned molecules tend to reposition themselves, allowing greater access to other, heretofore unaffected molecules. A second module 13, providing a proportionally higher increment of directional magnetic energy, increases the degree of magnetic saturation within the substance. This incremental process continues with the use of a third 14 and fourth 15 module, to attain a significantly higher degree of overall magnetic saturation within the substance. The modules are attached to each other by the use of module couplers 16A and 16B. Each coupler has four connectors 18 as shown in FIG. 6A on the front and back faces. These connectors snap into matching connector insets 17 provided on the front and back faces of each module.

Figure 7:
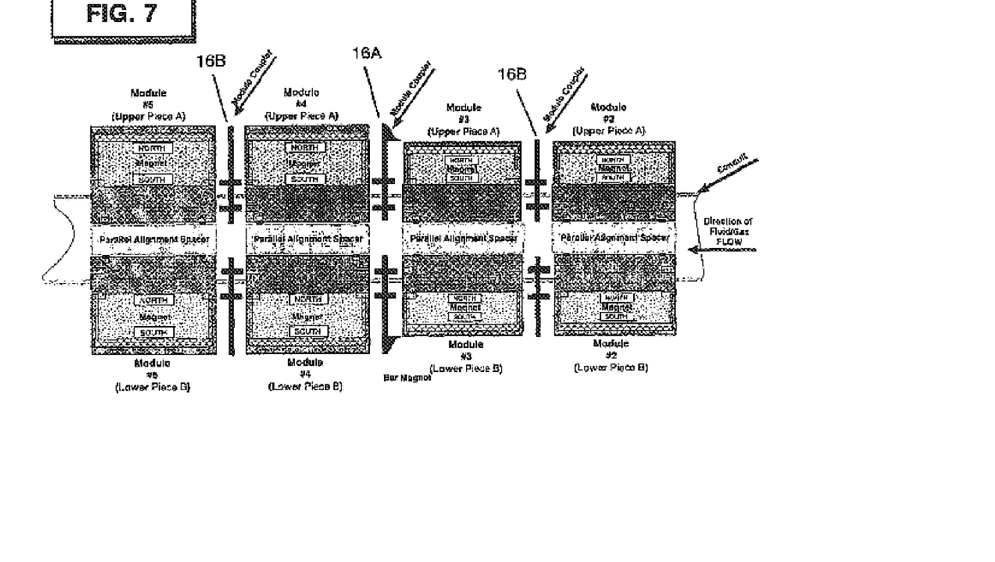
FIG. 7 is an exploded cut-away side view showing the details of the partial modular usage configuration of FIG. 6. Modules are shown along the conduit, separated for greater detail utilizing modular couplers.

Modular design permits a more specific application of the invention to particular types of substances and conduits or containment vessels. FIG. 7 depicts an exploded cut-away side view of another four-module configuration. This exploded view shows the relative use of module couplers 16A and 16B. These couplers 16A and 16B, allow the modules to be positioned around the conduit as an aligned group, maintaining a consistent magnetic directional flow. The invention is designed to work consistently regardless of angular position, with respect to the conduit, as long as the modules remain aligned and parallel, relative to each other and normal to the flow of the treated substance.

Figure 8:
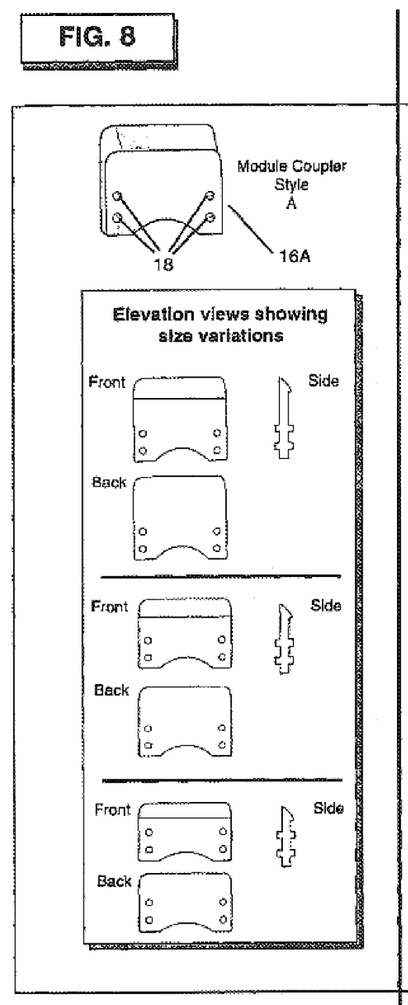
FIGS. 8 and 8A are front, back and side perspective elevation views respectively of individual module couplers.
Figure 8A:
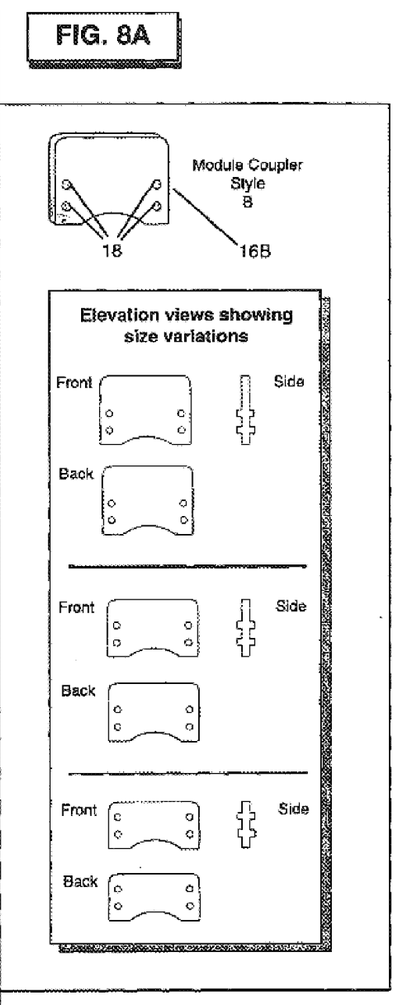

Front, back and side views of the individual module coupler styles A and B are provided in FIGS. 8 and 8A. There are six module couplers in total. Of these, there are essentially two styles that are adjustable in height to accommodate the relative height differences amongst the eight modules. All of the couplers have a total of eight connectors 18. Of these, there are essentially two styles that are adjustable in height to accommodate any relative height differences among the modules. The couplers have a total of eight connectors 18. There are four connectors on each front and back face of a typical coupler. These connectors are cylindrical in shape and are positioned and sized to snap into matching connector insets 17 on the front and rear faces of each module piece.

Figure 9:
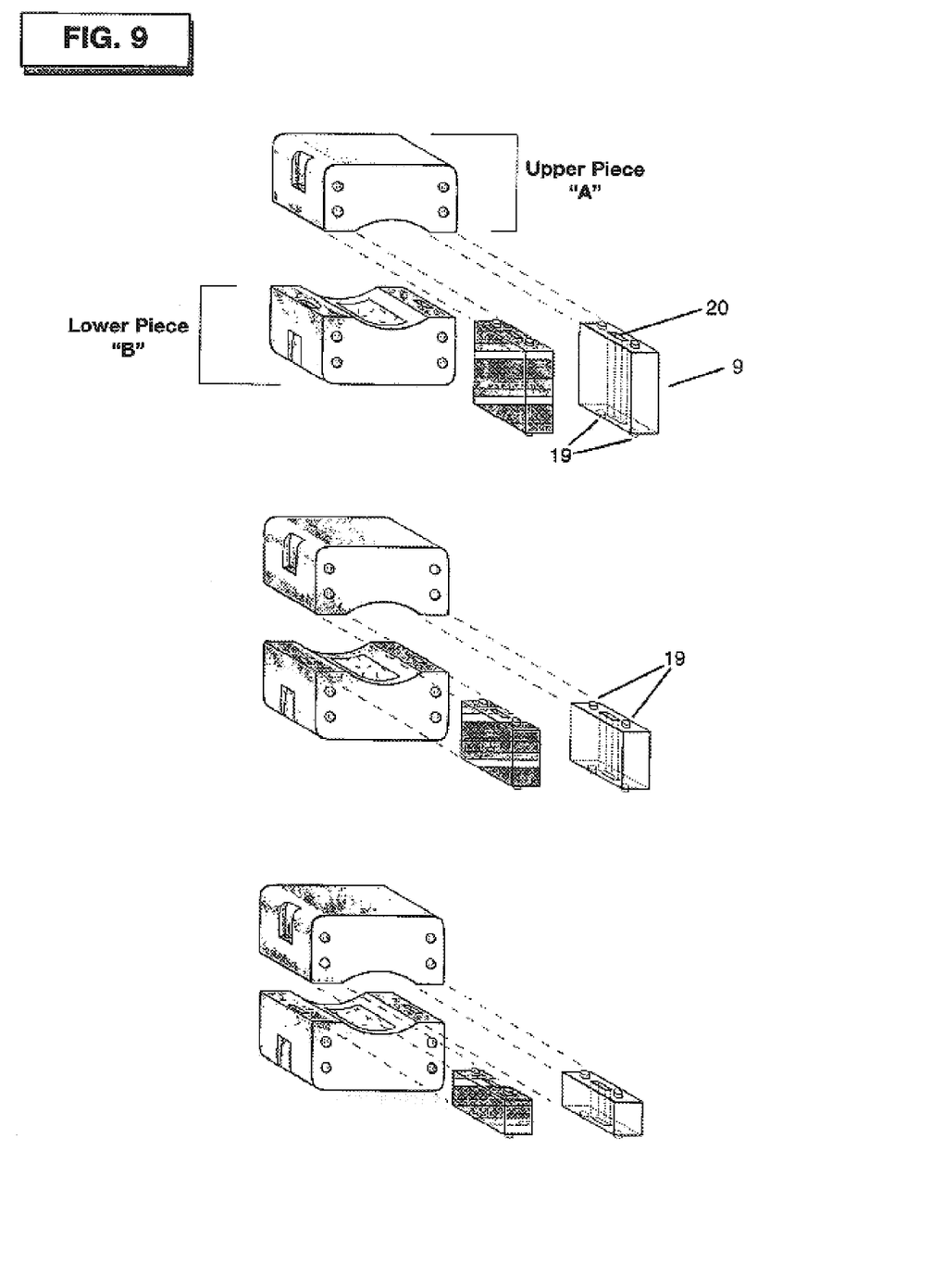
FIG. 9 shows perspective views of parallel alignment spacer sizes.

FIG. 9 is a perspective view of the parallel alignment spacers. A set of two matching spacers may be used incrementally, varying by height to best accommodate the open space between the pieces (A/B) of a typical module. Each spacer is rectangular in shape and possesses two connectors 19 on each of the top and bottom faces. Between the connectors is a slot 20 to accommodate the threading of the plastic tie. These connectors snap into their matching insets (21 in FIGS. 1A, 2A and 3A) provided on the bottom surface of each module piece A and B. The various sizes shown are for illustrative purposes and are not intended to limit their use for this invention.

Figure 10:
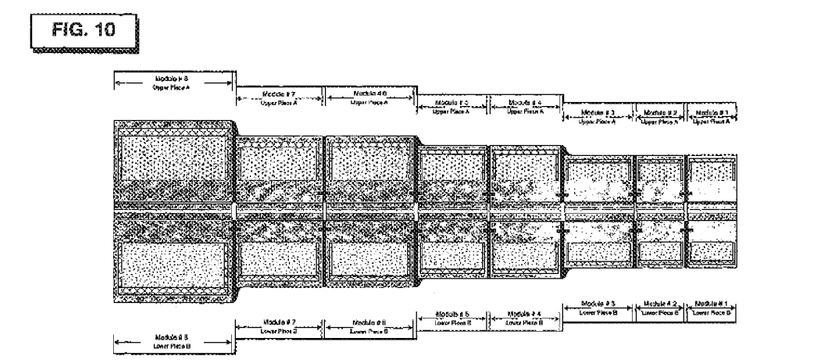
FIG. 10 is a cut-away side elevation view of the total system positioned along a conduit (not shown).

FIG. 10 is a cut-away side elevation view of a preferred embodiment of the invention showing its manner of operation. With the provision of an initial, directional and non-uniform flux density within the air gap of Module #1, the magnetic conditioning begins effecting magnetic moments on less resistant molecules within the treated substance. The aligned molecules reposition themselves thereby creating greater access to other, non-affected molecules. A second and higher level of magnetic phasing is provided by Module #2, thereby effecting a higher degree of magnetic moments and continuing to promote the uniform unfolding of molecular chains. The process continues by incrementally increasing the level of magnetic phasing, accomplished by Modules #3–#8, respectively.

Figure 10A:
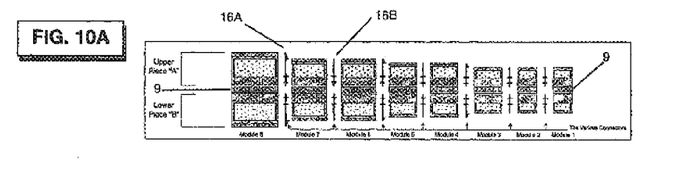
FIG. 10A is an inset showing an exploded and cut-away side elevation view of the total system highlighting couplers and parallel alignment spacers.

In FIG. 10A a complete system of eight modules is positioned along a conduit (not shown) in an incremental manner. The module spacers maintain consistent and relative positioning of the upper piece "A" and lower piece "B" of each adjoining module.

Figure 11:
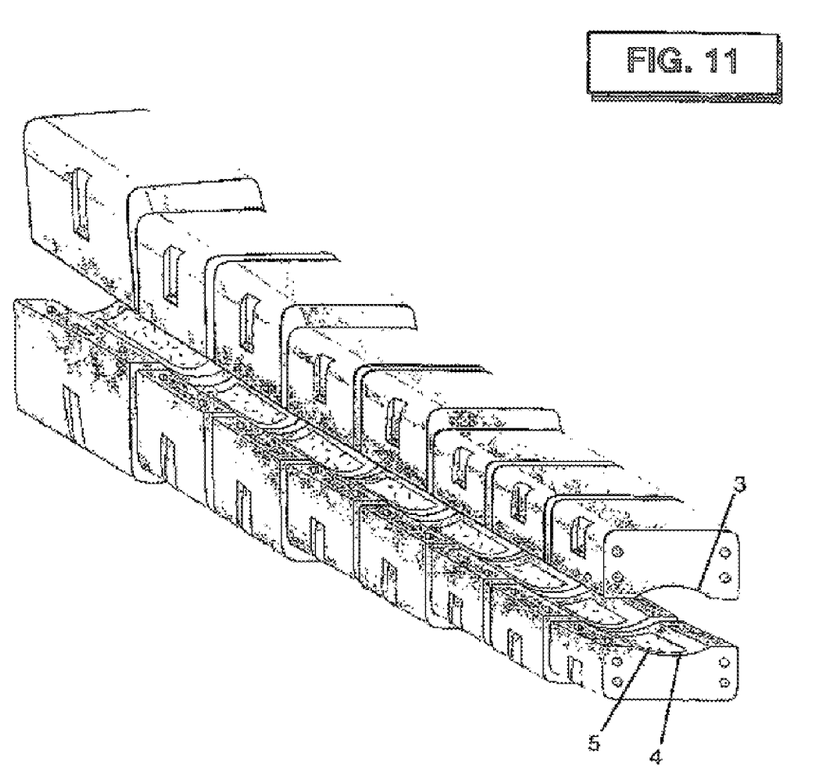
FIG. 11 is a perspective view of a preferred embodiment highlighting the total system. The invention is positioned to be mounted along a conduit (not shown).

FIG. 11 is a perspective view showing the system properly positioned above and below the conduit 1 (not shown in FIG. 11). In order to provide greater detail of how the conduit is specifically positioned along the alignment channel 3 of each module, the parallel alignment spacer means 9 are not shown. The direct access openings 4 are shown positioned to be fitted up against the outer wall of the conduit.

As few as one or as many as eight modules may be used together to attain the benefits as described herein. It is considered that by providing the modular design, the process and apparatus can best be applied to the many variables presented in real-world usage. As presented, an optimal degree of saturation is accomplished by the use of two to eight modules. As previously stated, the beneficial effect of applying continuously stronger magnetic fields to a particular substance reaches a measurable point of diminishing returns. Additional modules are statistically and economically inconsequential. Although more may be used, exceeding eight modules reaches the point of diminishing returns and yielding no significant difference or change in effectiveness. Empirical Testing and Comparative Discussion of Results Preliminary testing is performed on multiple vehicles with the same engine characteristics. Driver, vehicle weight/shape and trip characteristics are also relatively constant. The testing objective is to obtain annual miles per gallon (MPG) or kilometers per liter (Km/L) averages for different devices on as many vehicles as possible. Prototypes of the apparatus described herein are also tested along identical guidelines. The vehicles represent a range of engines and similar vehicle models offered by three different manufacturers. A total of six basic engine size groups are established and the relative distance data for each engine group is used to develop an average distance baseline for each engine size group.

The initial baseline mileage data is accumulated from records kept over a two-year period, grouping the vehicles by engine size, vehicle model, weight and trip length. No magnetic devise is used for the initial baseline testing.

Secondary testing is accomplished by attaching a commercially available magnetic device to the fuel lines of the same range of vehicles and within 8 feet (2.4 meters) from the combustion source of the vehicles and recording the distance in miles or kilometers, vehicle and trip characteristics. This data is accumulated over a period of one year to attain a similar average MPG or Km/L for the same vehicle range.

Figure 12:
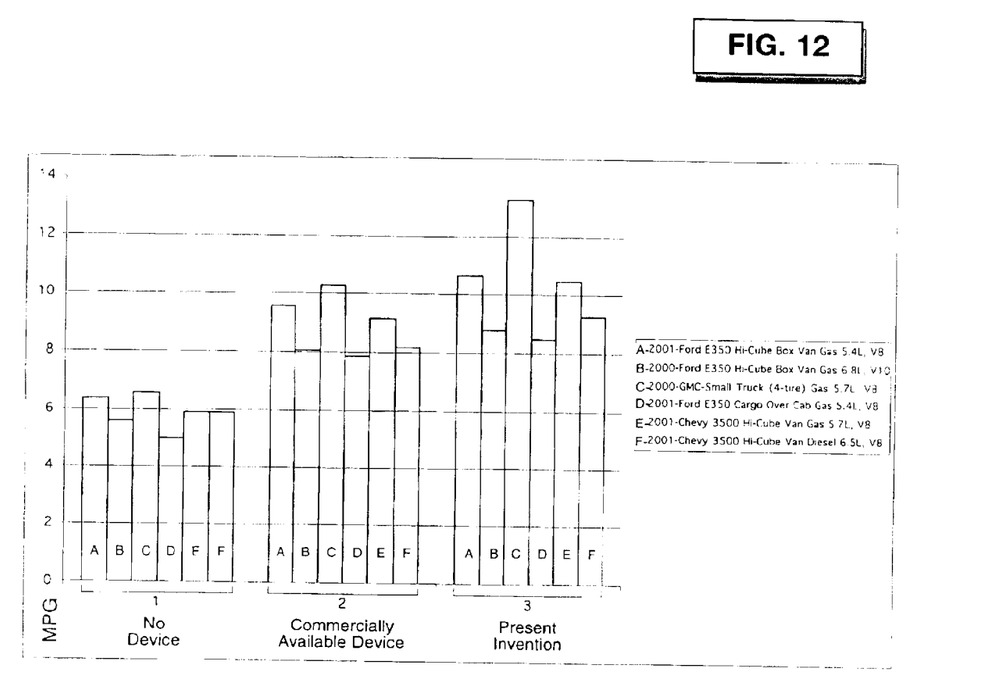
FIG. 12 is a chart depicting performance improvement in accordance with the present development.

Prototypes of the invention described in this application are also tested along identical guidelines. The comparative testing of vehicles using the commercially available product versus the unequipped vehicles, in annual MPG or Km/L is then used to compare against this invention's prototype results. The table in FIG. 12 details the characteristics of unequipped vehicles, vehicles with the commercially available device, the prototypes of the current invention, and shows a substantial increase in MPG or Km/L efficiency after installation of the prototype device. The new invention attains an increased average MPG or Km/L of 12% over that of the commercial product tested. Additionally, the new invention demonstrates more consistent overall results. It is important to note that only one (1) module of the total eight (8) modules comprising this invention are used in this comparative testing.

It will be apparent that various modifications and changes can be made to the process and apparatus described herein without departing from the spirit of the present invention.

What is claimed is:

1. An apparatus for magnetic conditioning of fluid and gas substances flowing through a conduit, said apparatus comprising one to eight two-part paired modules firmly mounted on an exterior surface of said conduit for fluids and gases, each part of the each module being substantially parallel to the other part of the module, there being present a magnet in each part of each module in direct contact to said conduit, wherein one of the magnets in each part of each module has a higher flux density than the magnet in the parallel part and the polarities and alignment of each of the magnets is such that there is created a mono-directional magnetic field normal to the direction of flow of said substances in said conduit and wherein the side of one of said magnets of said module facing said conduit is opposite in polarity to the polarity of the magnet face opposite to it.

2. The apparatus claimed in claim 1 wherein two to eight paired modules are present.

3. The apparatus claimed in claim 2 wherein all of said higher flux density magnets are adjacent to one another in the parts of said modules and all of the lower flux density magnets are adjacent to one another in the opposite parts of said modules.

4. The apparatus claimed in claim 2 wherein the positioning of the higher flux density magnet and the lower flux density magnet are staggered in the parts of the modules.

5. The apparatus claimed in claim 1 wherein spacing between the module parts are spaced in parallel alignment.

6. The apparatus claimed in claim 1 wherein said magnets are heat stabilized anisotropic.

7. The apparatus claimed in claim 6 wherein said magnets are either square or rectangular.

8. The apparatus claimed in claim 6 wherein advanced insulative shielding is present.

9. The apparatus of claim 8 wherein said shielding is formed of one-piece and encapsulates 2–5 faces of each of said magnets.

10. The apparatus claimed in claim 8 wherein said shielding is formed of individual pieces and encapsulates 2–5 faces of each of said magnets.

11. The apparatus claimed in claim 1 wherein the flux densities for the magnets is in the range of from about 2,200 Gauss for one magnet and about 3,850 to about 11,000 Gauss for the other magnet, with the proviso that the difference in flux density between the magnet of higher flux density to the magnet of lower flux density is at least about 800 Gauss.

12. A process for magnetic conditioning of fluid and gas substances comprising passing fluid or gas substances through a conduit, by firmly mounting one to eight two-part modules on said exterior surface of said conduit, wherein each part of each module is substantially parallel to the other part of the module, there being present a magnet in each part of each module, wherein one of the magnets in each part of each module is of higher flux density than the magnet in the parallel part, aligning the magnets with opposite polarities on the side of each magnet facing said conduit, so that there is created a mono-directional magnetic field normal to the direction of the flow of said substances in said conduit and thereby creating a non-uniform flux density in an air gap in said modules to disrupt laminar flow of said fluids or gases and thereby increase their performance efficiency.

13. The process claimed in claim 12 wherein the difference in flux density between the magnet of higher flux density and the magnet of lower flux density is at least about 800 Gauss.

* * * * *

UNITED STATES PATENT AND TRADEMARK OFFICE
CERTIFICATE OF CORRECTION

PATENT NO. : 6,849,188 B2
APPLICATION NO. : 10/321943
DATED : February 1, 2005
INVENTOR(S) : Steven Sacs It is certified that error appears in the above-identified patent and that said Letters Patent is hereby corrected as shown below:

Col. 16, line 42 (Claim 11, line 2) after "2,200" insert --Gauss to about 10,200--

Signed and Sealed this

Sixteenth Day of September, 2008

JON W. DUDAS
*Director of the United States Patent and Trademark Office*